(12) United States Patent
Kim (10) Patent No.: US 9,821,907 B2
(45) Date of Patent: Nov. 21, 2017

(54) INFLATABLE WING FOR ROTARY-WING AIRCRAFT

(71) Applicant: Korea Aerospace Research Institute, Daejeon (KR)

(72) Inventor: Joune Ho Kim, Daejeon (KR)

(73) Assignee: KOREA AEROSPACE RESEARCH INSTITUTE, Daejeon (KR)

(*) Notice: Subject to any disclaimer, the term of this patent is extended or adjusted under 35 U.S.C. 154(b) by 573 days.

(21) Appl. No.: 14/451,693

(22) Filed: Aug. 5, 2014

(65) Prior Publication Data
US 2015/0041583 A1 Feb. 12, 2015

(30) Foreign Application Priority Data
Aug. 7, 2013 (KR) .......................... 10-2013-0093510

(51) Int. Cl.
| | | |
|---|---|---|
| B64C 3/30 | (2006.01) | |
| B64C 27/473 | (2006.01) | |
| B64D 25/18 | (2006.01) | |

(52) U.S. Cl.
CPC .............. *B64C 27/473* (2013.01); *B64C 3/30* (2013.01); *B64D 25/18* (2013.01)

(58) Field of Classification Search
USPC ........ 244/123.11, 139, 123.1, 123.14, 17.11, 244/17.25
See application file for complete search history.

(56) References Cited

U.S. PATENT DOCUMENTS

| | | | | |
|---|---|---|---|---|
| 2,616,509 A | * | 11/1952 | Thomas | B64C 3/30 244/113 |
| 4,725,021 A | * | 2/1988 | Priddy | B64C 3/30 244/123.11 |
| 5,725,709 A | * | 3/1998 | Jensen | B29C 70/30 156/155 |
| 5,836,544 A | | 11/1998 | Gentile | |
| 6,015,115 A | * | 1/2000 | Dorsett | B64C 3/46 244/123.11 |
| 6,082,667 A | * | 7/2000 | Haggard | B64C 3/30 244/123.11 |
| 6,199,796 B1 | * | 3/2001 | Reinhard | B64C 3/30 244/201 |
| 6,347,769 B1 | * | 2/2002 | To | B63B 1/248 244/219 |
| 8,042,772 B2 | * | 10/2011 | Lutke | B64C 3/46 244/123.11 |
| 8,342,451 B1 | * | 1/2013 | Lutke | B64C 1/34 244/123.1 |
| 8,366,057 B2 | * | 2/2013 | Vos | B64C 3/46 244/123.11 |
| 8,727,280 B1 | * | 5/2014 | Lutke | B64C 3/30 244/123.11 |
| 8,870,125 B2 | * | 10/2014 | Balzer | B64C 9/16 244/215 |

(Continued)

*Primary Examiner* — Christopher P Ellis
(74) *Attorney, Agent, or Firm* — Cantor Colburn LLP (57) ABSTRACT

Provided is an inflatable wing for a rotary-wing aircraft capable of obtaining auxiliary lift by inflating the inflatable wing equipped on the fuselage when a main rotor is in non-powered rotation state by not providing power for rotating the main rotor due to causes such as an engine failure in a conventional type of rotary-wing aircraft having a single engine, thereby providing a safer emergency landing.

6 Claims, 5 Drawing Sheets

(56) References Cited

U.S. PATENT DOCUMENTS

| | | | |
|---|---|---|---|
| 2003/0001045 A1* | 1/2003 | Yifrach | B64C 3/56 244/35 R |
| 2005/0001089 A1* | 1/2005 | Rossy | B64D 17/00 244/4 A |
| 2006/0108469 A1* | 5/2006 | Elam | B64C 39/024 244/3.29 |
| 2009/0206196 A1* | 8/2009 | Parks | B64C 3/56 244/49 |
| 2010/0237192 A1* | 9/2010 | Sanderson | B64C 3/30 244/123.11 |
| 2015/0041584 A1* | 2/2015 | Lu | B64D 25/00 244/100 A |

* cited by examiner

INFLATABLE WING FOR ROTARY-WING AIRCRAFT

CROSS-REFERENCE TO RELATED APPLICATIONS

This application claims priority under 35 U.S.C. §119 to Korean Patent Application No. 10-2013-0093510, filed on Aug. 7, 2013, in the Korean Intellectual Property Office, the disclosure of which is incorporated herein by reference in its entirety.

TECHNICAL FIELD

The following disclosure relates to an inflatable wing for a rotary-wing aircraft, and in particular, to an inflatable wing for a rotary-wing aircraft which may be inflated under the conditions that lift is insufficient due to an engine failure, a tail rotor failure, and the like to provide additional lift and yawing controllability, thereby assisting an emergency landing.

BACKGROUND

A rotary-wing aircraft such as manned and unmanned helicopters is conventionally configured to include a fuselage which includes one main rotor (main rotary-wing) system charging lift and thrust, an engine providing a rotary power, and a transmission transferring a rotary power and one tail rotor (tail rotary-wing) system determining directivity by offsetting a torque generated by a rotation of the main rotor.

In the case of a helicopter having a twin engine or at least three engines, even though one engine fails, convention on international civil aviation forcibly regulates a horizontally forward flight of the helicopter using the remaining one or two engines for a predetermined time in terms of minimum safety. However, in the case of the conventional helicopter having a single engine, when the helicopter is in a non-powered state due to an engine failure, the helicopter may not perform the horizontally forward flight and therefore has a difficulty in an emergency landing.

As the related art to solve the above problem, there is U.S. patent Ser. No. 05/836,544 (Nov. 17, 1998) entitled "Emergency soft-landing system for rotor-type aircraft".

The related art discloses an apparatus which provides lift for safe emergency landing by deploying parachutes from a front cockpit part and a rear tail wing when the helicopter having the single engine fails.

However, the apparatus according to the related art may deploy the parachutes only in the state which the main rotor of the helicopter is not rotated. The reason is that when the parachutes are deployed in the situation such as autorotation in which the main rotor is in a non-powered state, a secondary accident due to tangling of a parachute cord may be prevented. Therefore, the apparatus may be restrictively used only in extreme situations such as an engine stop, a main rotor stop, and a tail rotor stop.

Further, a posture of the helicopter may be safely maintained only when the parachutes are simultaneously deployed. When any one of the parachutes is deployed, a weight is concentrated on one side and thus the cockpit having a heavy weight may first collide with a ground.

Further, it is substantially impossible to induce the lift for the safe emergency landing by deploying the parachutes and to control a direction and a speed of the helicopter for the emergency landing, such that the helicopter may not make a safe landing with escaping a downtown such as a densely populated area, a mountainous terrain, and the like.

RELATED ART DOCUMENT

Patent Document

U.S. patent Ser. No. 05/836,544 (Nov. 17, 1998)

SUMMARY

An embodiment of the present invention is directed to providing an inflatable wing for a rotary-wing aircraft capable of obtaining auxiliary lift by inflating the inflatable wing provided in a fuselage when a main rotor is in non-powered rotation state by not providing power for rotating the main rotor due to causes such as an engine failure in a general rotary-wing aircraft having a single engine, thereby providing a safer emergency landing.

In one general aspect, an inflatable wing for a rotary-wing aircraft includes: a wing part 110 configured to be installed on a fuselage of the rotary-wing aircraft, include a main wing 111 which has a predetermined width and length and an inside formed in a hollow, an aileron 112 extendedly formed in a width direction of the main wing 111, and a moving guide part 113 which is provided in the main wing 111 to guide an expansion of the main wing 111 and provide a support force, and have air injected or discharged thereinto or therefrom; and an air supply part configured to include an air supply apparatus which injects or discharges air into or from the wing part 110.

The wing part 110 may further include an air inlet 114 which injects or discharges air into or from the main wing 111 and the second aileron 112b and the main wing 111 and the aileron 112 may be laterally (wing length directionally) expanded and contracted depending on the injection or discharge of air.

The air supply part may further include an air supply pipe 122 having one side communicating with the air supply apparatus 121 and the other side communicating with the air inlet 114 of the wing part 110.

The aileron 112 may be configured to include a first aileron 112a which is linked with the main wing 111 and a second aileron 112b which is linked with the first aileron 112a.

An angle formed by the second aileron 112b and the main wing 111 may be controlled depending on an air injection amount of the first aileron 112a.

The moving guide part 113 is configured to include a fixing guide 113a provided at a center of the main wing 111 and moving guides 113b provided on both sides of the fixing guide 113a.

The inflatable wing may further include: a connection reinforcing member configured to be formed between a fuselage of the rotary-wing aircraft and the wing part 110 to reinforce a connection between the fuselage and the wing part 110.

In another general aspect, an inflatable wing for a rotary-wing aircraft includes: a wing part 110 configured to be laterally expanded and contracted based on a forward flight direction of an aircraft having a rotary-wing to select auxiliary lift depending on expansion or contraction of the wing part 110.

The wing part 110 may be configured to include a main wing 111 and an aileron 112 and control an angle of the aileron 112 so that a wing area contacting a downwash which is an air inflow generated by rotating the rotary-wing in a state in which the inflatable wing is supplied with the auxiliary lift from the wing part 110 is reduced.

An angle formed by the wing part 110 and a relative wind blowing from a forward flight direction of the rotary-wing aircraft in a state in which the inflatable wing may be supplied with the auxiliary lift from the wing part 110 is controlled.

The inflatable wing for a rotary-wing aircraft may serve as a floating system at the time of making an emergency landing on a water surface of sea or lake in a state in which the wing part 110 is expanded.

Other features and aspects will be apparent from the following detailed description, the drawings, and the claims.

DETAILED DESCRIPTION OF MAIN ELEMENTS

110: Wing part
111: Main wing
112: Aileron
112*a*: First aileron
112*b*: Second aileron
113: Moving guide part
113*a*: Fixing guide
113*b*: Moving guide
114: Air inlet
121: Air supply apparatus
122: Air supply pipe

DETAILED DESCRIPTION OF EMBODIMENTS

Hereinafter, an inflatable wing for a rotary-wing aircraft will be described in detail with reference to the accompanying drawings. The drawings to be provided below are provided by way of example so that the idea of the present invention can be sufficiently transferred to those skilled in the art to which the present invention pertains. Accordingly, the scope of the present invention is not restricted to the following description and accompanying drawings. In addition, like reference numerals denote like elements throughout the specification.

Figure 1:
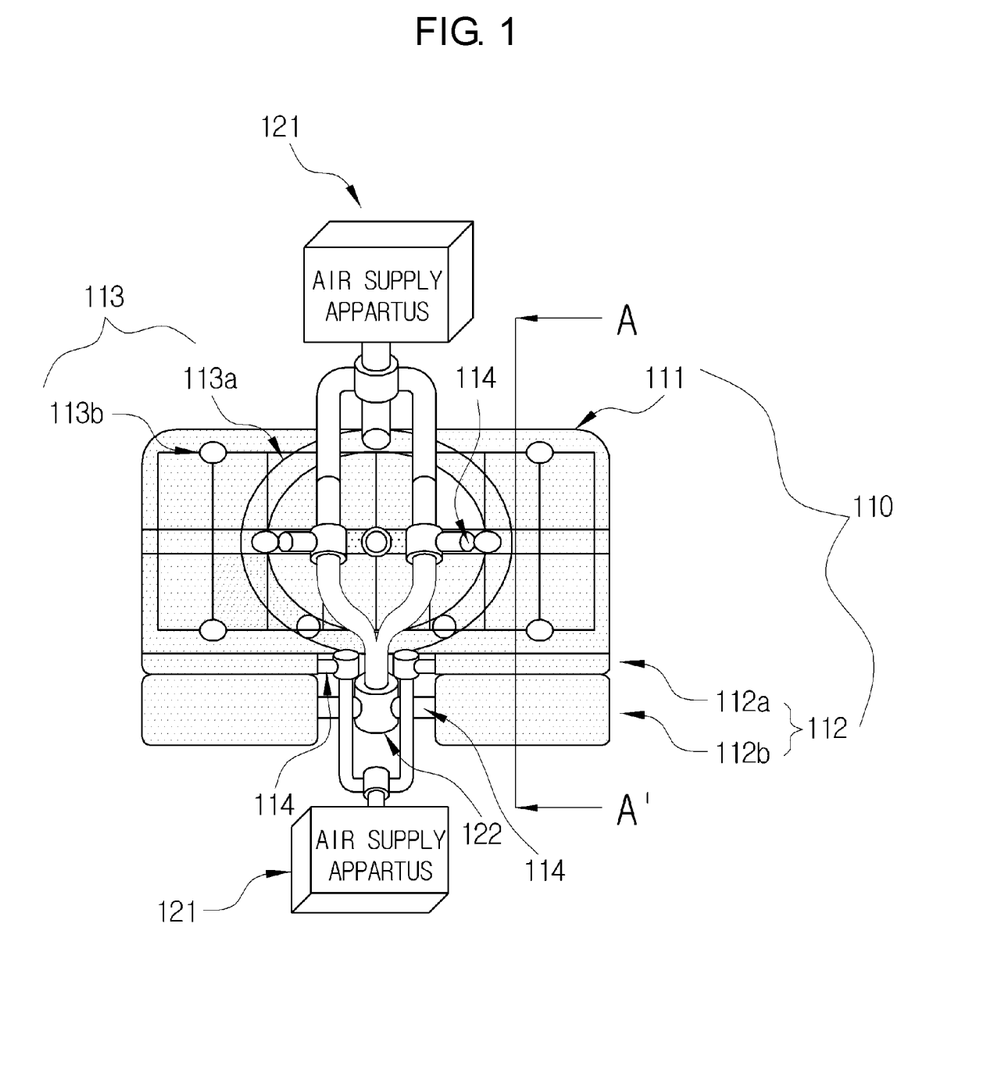
FIG. 1 illustrates an inflatable wing for a rotary-wing aircraft according to an exemplary embodiment of the present invention.
Figure 2:
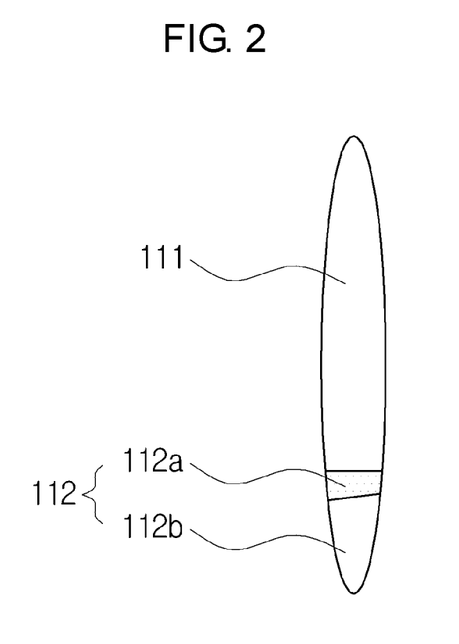
FIG. 2 is a cross-sectional view taken along the direction A-A' of FIG. 1.
Figure 3:
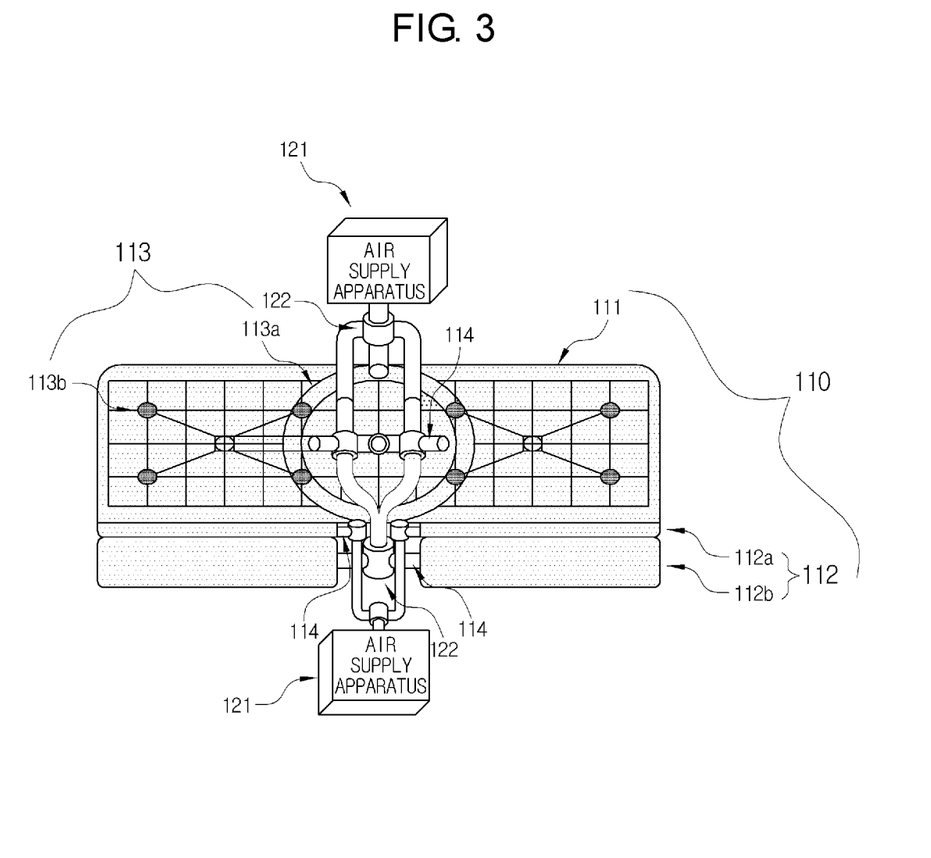
FIG. 3 is a diagram illustrating an example in which the inflatable wing for a rotary-wing aircraft according to the exemplary embodiment of the present invention is inflated.
Figure 4:
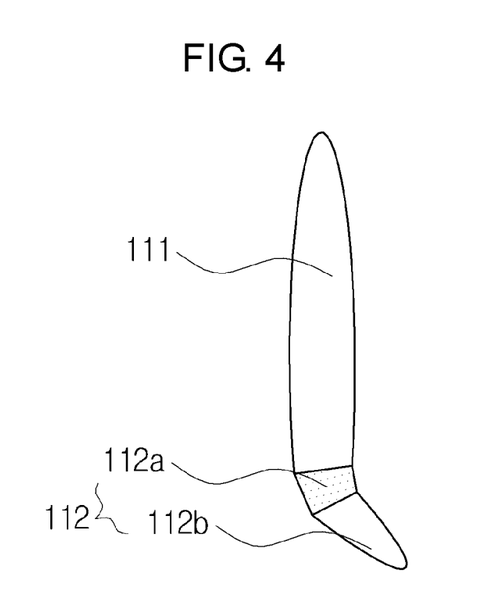
FIG. 4 is a diagram illustrating a pitch angle control of an inflatable wing according to the exemplary embodiment of the present invention.

FIG. 1 illustrates an inflatable wing for a rotary-wing aircraft according to an exemplary embodiment of the present invention, FIG. 2 is a cross-sectional view taken along the direction A-A' of FIG. 1, FIG. 3 is a diagram illustrating an example in which the inflatable wing for a rotary-wing aircraft according to the exemplary embodiment of the present invention is inflated, and FIG. 4 is diagram illustrating a control of a wing pitch angle according to the exemplary embodiment of the present invention.

A helicopter which is a representative rotary-wing aircraft is generally configured to include a fuselage which includes one main rotor (main rotary-wing) system charging lift and thrust, an engine providing a rotary power, a transmission transferring a rotary power and one tail rotor (tail rotary-wing) system determining directivity by offsetting a torque generated by a rotation of the main rotor. When the engine stops due to a failure of components, in particular, an unspecific failure during an operation of the helicopter having the above configuration, the situation in which the main rotor charging lift and thrust is not rotated occurs and thus the helicopter may not generate the lift and the thrust, such that the helicopter may enter a free fall state.

However, the helicopter has a free wheeling apparatus disposed between the engine and the rotor and thus may keep a continuously rotating state due to a rotational inertia of the main rotor itself even though a rotation torque of the engine is not transferred.

This situation is called non-powered rotation or autorotation. The rotary power of the rotor is reduced with the passage of time in the state in which the rotation power from the engine is not supplied and when a situation in which a collective pitch angle controlling a size of an angle of attack in proportion to the lift of the main rotor is large occurs, the rotary power of the main rotor may be rapidly reduced within several seconds.

In this case, if a conventional helicopter may keep a minimum forward speed itself, minimally reduce the collective pitch angle, and be equipped with an inflatable wing which may generate auxiliary lift, the rotary power of the main rotor may be maximally reserved and a reduction rate of potential energy reserved in a certain flight altitude may be delayed, such that the helicopter may more safely make an autorotation flight, thereby improving the safety of the emergency landing.

Figure 5:
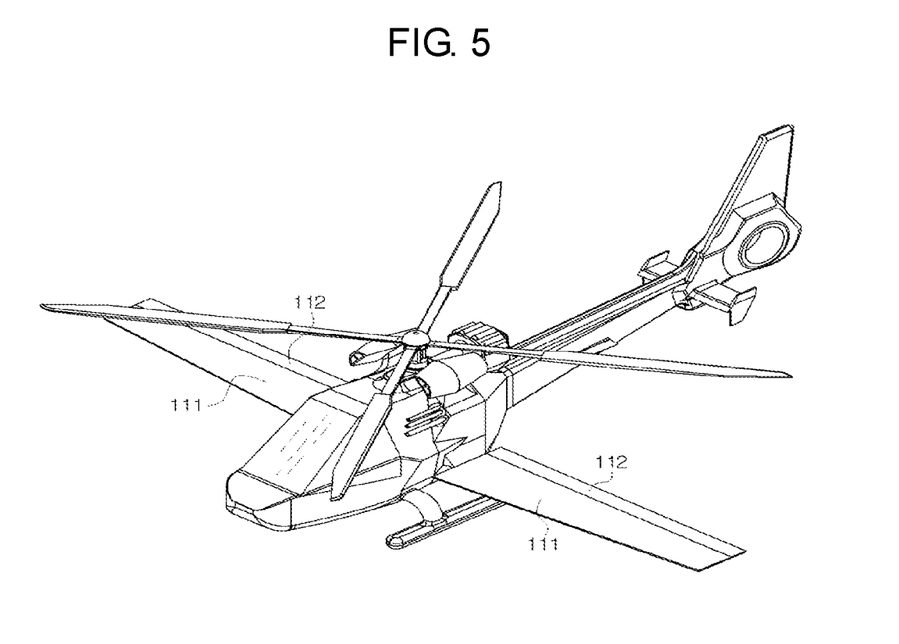
FIG. 5 is an example showing an inflatable wing for a rotary-wing aircraft according to the exemplary embodiment of the present invention.

As illustrated in FIGS. 1 and 3, the inflatable wing for a rotary-wing aircraft providing the auxiliary lift is configured to include a wing part 110 which is installed on the fuselage of the aircraft, includes a main wing 111 having an inside formed in a hollow to be expanded and contracted depending on injection or discharge of a compressed air through an air inlet 114, an aileron 112 extendedly formed in a width direction of the main wing 111 to be expanded and contracted depending on the injection or discharge of air, and a moving guide part 113 provided in the main wing 111 to guide the expansion and contraction of the main wing 111 and provide a support force to the internal structure and an air supply part including an air supply apparatus 121 which injects and discharges air. In this configuration, the wing part 110 may be disposed at a position close to the center of gravity of the fuselage. The reason is that auxiliary lift generated by deploying the wing part 110 is generated at the position close to the center of gravity to minimize an influence on a balance of the fuselage. That is, as shown in FIG. 5, the wing part 110 may be deployed at the position close to the center of gravity of the fuselage.

In this configuration, the air supply apparatus 121 which is an apparatus generating the compressed air may be configured so that time required to deploy the main wing 111 and the aileron 112 is minimized.

Further, as illustrated in FIGS. 1 and 2, the aileron 112 is extendedly formed in the width direction of the main wing 111 and is configured to sequentially include a first aileron 112*a* linked with the main wing 111 and a second aileron 112*b* linked with the first aileron 112*a*.

In this case, as illustrated in FIG. 1, the main wing 111 and the first aileron 112*a* each has independent air inlets 114 and an air supply pipe 122 having one side communicating with the air supply apparatus 121 and the other side communicating with the air inlets 114 of the main wing 111 or the first aileron 112a. The second aileron 112b has pneumatic coupling with the main wing 111 so that the second aileron 112b is expanded and contracted simultaneously with the main wing 111.

By the configuration, as illustrated in FIGS. 4, the second aileron 112b serves as a flap of a fixed-wing aircraft by individually controlling the amount of air injected into the first aileron 112a having a wedge shape. That is, the expansion of the first aileron 112a is controlled depending on the amount of injected air and thus the pitch angle formed by the main wing 111 and the second aileron 112b is controlled to provide a control function in a yaw direction (rotation direction based on a main rotor shaft of the helicopter) of the fuselage, thereby more safely inducing gliding and landing. Further, a flare operation of the main rotor instantly maximizing the collective pitch angle in the situation in which the fuselage is close to the ground may be performed by maximizing a pitch angle between the main wing 111 and the second aileron 112b by making the first aileron 112a control the amount of injected air.

In addition, the moving guide part 113 which is provided at the main wing 111 to guide the expansion of the main wing 111 and provide the support force to the inner structure of the main wing 111 is configured to include a fixing guide 113a provided at a center of the main wing 111 and moving guides 113b provided on both sides of the fixing guide 113a. That is, the fixing guide 113a is formed as a fixing shaft and the moving guide 113b is formed as a moving shaft to serve to guide a direction in the expansion of the main wing 111 and assist the support force of the main wing 111. By the configuration, the insufficient support force may be reinforced and a malfunction occurring at the time of being deployed by injecting air may be minimized only by the main wing 111.

Further, although not illustrated in the drawings, a connection reinforcing member is formed between the fuselage and the wing part 110 to reinforce a connection between the fuselage and the wing part 110 and thus the coupling between the wing part 110 and the fuselage may be reinforced. This is to previously prevent the connection between the fuselage and the wing part 110 from being damaged due to a pressure applied to the wing part 110.

The inflatable wing for a rotary-wing aircraft according to the exemplary embodiment of the present invention is formed so that the wing part 110 which may be laterally (wing length directionally) expanded and contracted based on the forward flight direction is installed on the fuselage of the rotary-wing aircraft to select the auxiliary lift depending on the expansion and contraction of the wing part 110.

Therefore, the inflatable wing for a rotary-wing aircraft according to the exemplary embodiment of the present invention generates and controls the auxiliary lift by controlling an amount of air injected into the first aileron 112a in the state in which it is supplied with the auxiliary lift from the wing part 110, thereby securing the safety at the time of the emergency landing.

Further, the inflatable wing for a rotary-wing aircraft according to the exemplary embodiment of the present invention controls a pitch angle of the second aileron 112b, thereby controlling the angle of attack and the auxiliary lift from the wing part 110.

Meanwhile, the inflatable wing for a rotary-wing aircraft according to the exemplary embodiment of the present invention may serve as a float part at the time of making the emergency landing on a water surface such as sea and lake in the state in which the wing part 110 is expanded and thus the floating time is increased, thereby improving the safety of the pilot and the passenger.

According to the inflatable wing for a rotary-wing aircraft of the present invention, it is possible to improve the control performance of the lift and the thrust of the main rotor by making the inflatable wing partially bear the load added during the actual descent flight, while keeping the rotary power of the main rotor in the state in which the power is blocked due to the causes such as the engine failure of the helicopter.

Further, in the vicinity of the ground, it is possible to sharply reduce the descent speed of the helicopter by contracting the inflatable wing, implementing the flexible flare using the main rotor and adding the collective pitch using the residual kinetic energy of the rotary power reserved in the main rotor as the final step of the emergency landing, thereby providing the safe emergency landing.

In addition, the inflatable wing may be used like the wing of the compound helicopter to obtain the more improved high-speed horizontal flight performance than that of the existing helicopter and may be contracted in the low-speed and hover flight region to maximally obtain the ground effect.

Further, when the helicopter make an emergency landing on the water surface such as river, lake, and sea by using the inflatable wing in which the compressed air is closed, the helicopter may float, thereby increasing the survivability of the pilot and the passenger.

As described above, the present invention is described with reference to specific matters such as the detailed components and the limited exemplary embodiments, but is provided to help a general understanding of the present invention. Therefore, the present invention is not limited to the above exemplary embodiments and can be variously changed and modified from the description by a person skilled in the art to which the present invention pertain.

Therefore, the spirit of the present invention should not be limited to the above-described exemplary embodiments and the following claims as well as all modified equally or equivalently to the claims are intended to fall within the scope of the spirit of the invention.

What is claimed is:

1. An inflatable wing for a rotary-wing aircraft, the inflatable wing comprising:
    a wing part configured to be installed on a fuselage of the rotary-wing aircraft, wherein the wing part includes a main wing having a predetermined width and a predetermined length, an aileron extended from the main wing in a width direction of the main wing, and a moving guide part provided in the main wing to guide an expansion of the main wing and provide a support force to the wing part; and
    an air supply part including an air supply apparatus, the air supply apparatus being configured to inject air into the wing part and discharge the air from the wing part,
    wherein the wing part is configured to be installed on the fuselage along a width direction of the main wing, and the main wing and the aileron are configured to be expanded in a length direction of the main wing by the moving guide part when the air is injected into the wing part by the air supply apparatus.

2. The inflatable wing of claim 1, wherein the wing part further includes an air inlet through which the air is injected into and discharged from the main wing and the aileron.

3. The inflatable wing of claim 2, wherein the air supply part further includes an air supply pipe having one side communicating with the air supply apparatus and the other side communicating with the air inlet of the wing part.

4. The inflatable wing of claim 1, wherein the aileron is comprised of a first aileron linked with the main wing and a second aileron linked with the first aileron, the first aileron is injected with the air independently from the second aileron, and the second aileron has pneumatic coupling with the main wing.

5. The inflatable wing of claim 4, wherein an angle formed by the second aileron and the main wing is controlled depending on an amount of the air injected into the first aileron.

6. The inflatable wing of claim 1, wherein the moving guide part includes a fixing guide provided at a center of the main wing and moving guides provided on both sides of the fixing guide.

\* \* \* \* \*